Patented Aug. 22, 1933

1,923,524

UNITED STATES PATENT OFFICE 1,923,524

MANUFACTURE OF GOODS OF OR CONTAINING RUBBER

Harry Clarence Young and Charles Hemm, Manchester, England, assignors to Dunlop Rubber Company Limited, Birmingham, England, a British Corporation No Drawing. Application June 3, 1931, Serial No. 541,943, and in Great Britain March 21, 1931

4 Claims. (Cl. 18—58)

This invention comprises improvements in or relating to the manufacture of goods of or containing rubber or similar material by any one or more operations such as dipping, moulding or spreading from aqueous emulsions or dispersions thereof of the kinds hereinafter specified and is particularly concerned with the manufacture of goods of the aforesaid kinds provided with perforations.

The object of the present invention is to produce the perforations on the aforesaid goods during deposition.

According to one embodiment of the invention the process for the manufacture of goods of or containing rubber or similar material wherein the aforesaid goods are provided with perforations comprises applying the aforesaid emulsions or dispersions to a backing provided with suitable engravings, removing the emulsions or dispersions from the relief parts of the backing and coagulating as by drying the remaining portions of the applied emulsions or dispersions to a coherent film.

A latex mixing of any desired consistency can be applied, for instance, by spreading, to a suitable engraved plate, the latex on the relief parts of the plate removed by flowing or by the application of a squeegee or other suitable appliance and coagulating, as by drying, the remaining portion of the mix to a coherent film which preferably after vulcanization is removed from the plate.

This embodiment of the invention is found to be particularly suitable for the production of perforated articles provided with wide holes, such as rubber lace.

A further embodiment of the invention comprises dipping a mould of any suitable material, provided on its surface with a number of projections which are suitably spaced, into a latex mixing of any desired consistency, subsequently coagulating, as by drying, the deposit thereon and thereafter cutting the projections in the deposit flush with the main surface thereof, thereby producing a deposit containing perforations.

The projections on the mould may be formed preferably by drilling holes in the former and inserting plugs of approximately the same diameter as that desired for the holes. These projections may be on both sides of the former so that when the deposit is dried and cut round the edges, two similar articles are made, for instance, by one dipping operation from each former.

This further embodiment of the invention is found to be particularly suitable for the production of perforated articles provided with narrow holes such as rubber corsets.

The emulsions or dispersions comprise those consisting of or containing rubber, gutta-percha, balata or similar vegetable resins occurring naturally or artificially obtained and in vulcanized or unvulcanized condition.

Aqueous dispersions of coagulated rubber, vulcanized rubber, waste or reclaim, may also be employed, if desired, as alternatives or admixtures.

Any of the aforesaid dispersions may contain the usual known compounding ingredients, and/or may be in concentrated form.

Concentrates such as are obtained in United States Patent No. 1,846,164, February 23, 1932, to which may be added any one or more of the usual compounding ingredients, may also be used. All such materials and dispersions of whatever concentration, origin, form or composition are generically designated as "rubber material" in the claims.

If desired, in carrying out the invention, aqueous emulsions or dispersions can be employed which are to have been rendered capable of gelling on the application of heat or have been rendered capable of gelling in the cold in definite and controllable time intervals.

Furthermore, the aqueous emulsions or dispersions employed may be thickened.

Reversible compositions of plastic nature such as described and claimed in Patent 1,793,265 granted February 17, 1931, and other latex pastes which solidify upon the application of a slight shearing force under pressure can also be employed. The pressure can be applied by a cold or hot press, the paste being spread on a deformable backing and then compressed against the patterned plate.

The invention is not only applicable to ordinary latex mixings giving soft rubber products, but latex mixings can also be employed yielding hard rubber products. Such perforated hard rubber sheets may be satisfactorily employed as separators for storage batteries.

The following is given by way of example as to how the invention can be effected:

Rubber lace can be produced in the following manner:

A latex mixing made according to Patents

Nos. 1,846,164 and 1,898,604 of 67% solid content and of the following composition:

| | Parts by weight |
|---|---|
| Rubber | 100 |
| Sulphur | 1.5 |
| Tetramethylthiuram disulphide | 0.3 |
| Transformer oil | 5.0 |
| Zinc oxide | 4.0 |
| Pigment | 2.0 | is applied, as for instance, by pouring into a suitably engraved plate placed in a horizontal position. Excess is removed from the relief portions with a squeegee. The remainder of the mixing is dried and vulcanized in known manner. The perforated vulcanized sheet is cooled and stripped from the engraved plate.

What we claim is—

1. A process for the manufacture of perforated goods of rubber material by any one or more operations such as dipping, moulding or spreading from aqueous dispersions thereof which comprises applying the aforesaid dispersions to a backing provided with suitable engravings, removing the emulsions or dispersions from the relief parts of the backing, and coagulating the remaining portions of the applied emulsions or dispersions to a coherent film.

2. A process as claimed in claim 1 wherein the aqueous emulsions or dispersions on the relief parts of the backing are removed by flowing.

3. A process as claimed in claim 1 wherein the aqueous emulsions or dispersions on the relief parts of the backing are removed by a squeegee.

4. A process of making perforated rubber articles which comprises applying an aqueous dispersion of rubber material to a surface having a number of spaced projections, coagulating the applied aqueous emulsions or dispersions thereon, thereafter cutting the projections in the applied layer flush with the main surface thereof and removing the layer from said surface.

HARRY CLARENCE YOUNG.
CHARLES HEMM.